United States Patent Office 2,916,348
Patented Dec. 8, 1959

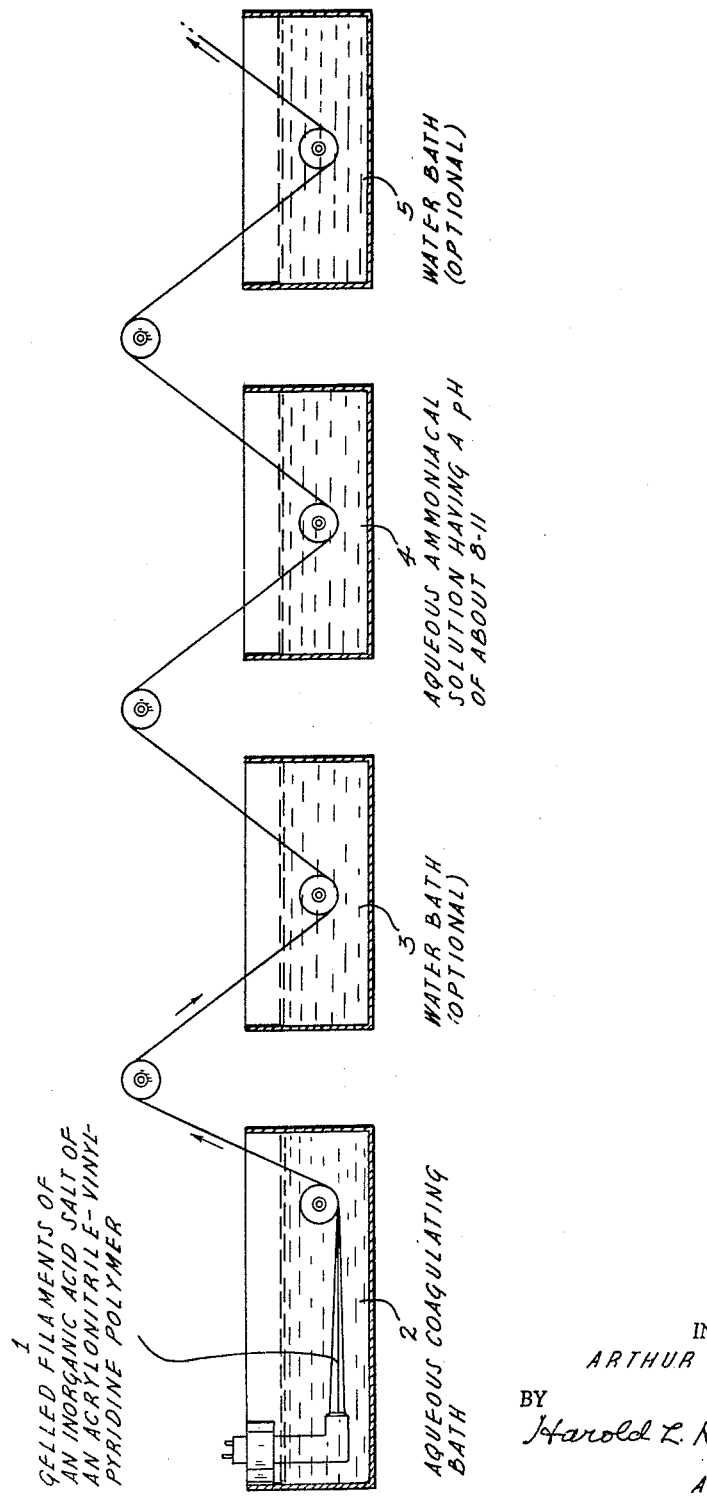

2,916,348

PRODUCTION OF POLYACRYLONITRILE FILAMENTS

Arthur Cresswell, Stamford, Conn., assignor to American Cyanamid Company, New York, N.Y., a corporation of Maine Application August 21, 1956, Serial No. 605,446

6 Claims. (Cl. 18—54)

This invention relates broadly to the art of producing polyacrylonitrile filaments, and more particularly is concerned with certain new and useful improvements in the production of filaments from a filament-forming (filament-formable) inorganic acid salt of an acrylonitrile polymer containing a basic monomer or monomers (specifically a vinylpyridine or mixture of vinylpyridines) combined in the polymer molecule.

Various methods of producing filaments, films and other shaped articles from homopolymeric acrylonitrile and from copolymers of a major proportion of acrylonitrile and a minor proportion of another monomer or monomers heretofore have been suggested. For example, in Rein U.S. Patent No. 2,140,921, dated December 20, 1938, it is proposed that various polyvinyl compounds including polyacrylonitrile and copolymers of acrylonitrile with another vinyl compound be dissolved in concentrated aqueous solutions of inorganic (metal) salts, e.g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in Latham U.S. Patent 2,404,714; Rogers U.S. Patents 2,404,715 and -725; Hansley U.S. Patent 2,404,176; Houtz U.S. Patents 2,404,713-722, -724 and -727; Merner U.S. Patent 2,404,723; Charch U.S. Patent 2,404,726; and Finzel U.S. Patent 2,404,728, all dated July 23, 1946, and also the use of such solutions in forming films, filaments, etc., therefrom.

Another method of producing filaments and other shaped products from polymers (homopolymers) and copolymers of acrylonitrile is disclosed and claimed in Cresswell U.S. Patent No. 2,558,730, dated July 3, 1951. The invention disclosed and claimed in that patent is based on the discovery that useful films, filaments, threads and other shaped articles can be produced from acrylonitrile polymerization products of the kind described therein and in the aforementioned patents, as well as hereinafter, by precipitating or coagulating the polymerization product in approximately its desired shape from a water-coagulable solution thereof, more particularly a concentrated aqueous salt solution of the kind disclosed by Rein in his U.S. Patent 2,140,921, the precipitation being effected by contacting the said solution with a cold aqueous coagulant, more particularly water alone, at a temperature not substantially exceeding +10° C. This coagulant is a non-solvent for the polymerization product but will dissolve the solvent in which the said product is dissolved. Surprisingly, it was found that by keeping the temperature of the aqueous coagulating bath at or below +10° C., e.g., within the range of −15° C. to +10° C. and preferably at from about −15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product.

Still other methods of producing filamentary material from a polymer of acrylonitrile are known. For example, British Patent No. 714,530 describes a method wherein a thread is formed from a spinning solution containing a polyacrylonitrile and, as a solvent therefor, a mixture consisting essentially of water, one or more water-miscible, aliphatic liquids containing an alcoholic hydroxyl group and not more than 6 carbon atoms in the molecule, and one or more highly water-soluble salts of a particular class which includes the alkali-metal thiocyanates. In another process of producing threads from a polymer of acrylonitrile (British Patent No. 732,135), a solution of the polyacrylonitrile in a concentrated aqueous solution of a water-soluble salt that yields highly hydrated ions in an aqueous solution is extruded into an aqueous coagulating bath in which is dissolved at least 5% by weight of the same water-soluble salt used as a solvent for the polymer, the coagulating bath also containing a water-miscible alcohol.

Processes such as described in the aforementioned patents have been mentioned as being applicable to the production of filaments from homopolymeric acrylonitrile and from copolymers thereof with many other monoethylenically unsaturated materials which are copolymerizable with acrylonitrile, e.g., methyl acrylate, vinyl acetate, acrylamide, acrylic acid, methacrylonitrile, etc. To improve the dye-receptivity of the filamentary polyacrylonitrile, it has been suggested in many patents that a basic monomer be copolymerized with the acrylonitrile to impart better dye-receptivity (especially toward acid dyes) to the end-product. The various vinylpyridines have been extensively used or proposed for this purpose (see, for example, Arnold U.S. Patent No. 2,491,471, dated December 20, 1949; Chaney and Hoxie U.S. Patent No. 2,687,938, dated August 31, 1954; Canadian Patent No. 522,812, dated March 20, 1956; and Canadian Patent No. 524,179, dated April 24, 1956).

When filaments or fibers are dry-spun from organic-solvent solutions of an acrylonitrile polymer that also contains a vinylpyridine combined in the polymer molecule, no particular problems are generally encountered even though it be in the form of an addition salt of the polymer with the acid used in the polymerization process, e.g., nitric, hydrochloric, sulfuric or other acid. However, when organic solvent solutions of an acrylonitrile-vinylpyridine copolymer containing bound anions are wet-spun into certain aqueous coagulating baths, e.g., an aqueous solution containing from about 3% to about 25% by weight of a water-soluble thiocyanate (specifically sodium thiocyanate), difficulties frequently arise due to the fact that the polymer (if not initially in the form of the thiocyanic acid salt) is converted into a thiocyanic acid salt when the polymer solution is extruded through the openings in a spinnerette to form a gelled filamentary material upon coming into contact with the said aqueous coagulating bath. Such difficulties commonly take the form of obtaining "off-shaded" colors when efforts are made to dye the finished fiber or fabric with certain dyes, e.g., premetallized acid dyes; and excessive (and often commercially prohibitive) amounts of wash water are required to reduce the bound anions to a permissible minimum. Also, the wet fiber may absorb appreciable amounts of iron (e.g., from corrosion of equipment), which then may make itself evident as red streaks of iron thiocyanate in the wet fiber (or as a pink or yellowish pink shade in the fiber after its initial drying) when a large amount of thiocyanic acid is bound with the polymer in the form of an addition salt. These same difficulties are encountered when the acrylonitrile-vinylpyridine copolymers are dissolved in certain aqueous solutions, e.g., a concentrated aqueous solution of a water-soluble thiocyanate, and for the same reasons.

The present invention is based on my discovery that, in producing filaments from a filament-forming, inorganic acid salt of an acrylonitrile polymer that also contains a vinylpyridine combined in the polymer molecule, the foregoing difficulties are obviated and improved results are obtained by wet-spinning, into an aqueous coagulating bath, a solution of the said salt of the said polymer to form a gelled filamentary material. Subsequently, this gelled filamentary material is contacted with an aqueous ammoniacal solution (preferably a solution of ammonia) having a pH ranging between about 8 and about 11, preferably a pH of about 10. By this treatment the gelled filamentary material is rendered substantially free of bound anions.

In a preferred embodiment of the invention the acrylonitrile polymer containing a vinylpyridine, more particularly a methyl vinylpyridine, combined in the polymer molecule is dissolved in a concentrated aqueous solution of a water-soluble salt which yields highly hydrated ions in an aqueous solution, e.g., sodium thiocyanate. This solution is then extruded through the openings of a spinnerette into a coagulating bath comprising water thereby to form a gelled filamentary material. Preferably the coagulating bath comprises water having dissolved therein from about 3% to about 25%, more particularly from about 5% to about 20%, by weight of the solution of the same water-soluble salt used in forming the solvent for the polymer. Upon removal from the coagulating bath, which preferably is maintained at a temperature not exceeding +10° C. as and for the reasons described in, for example, the aforementioned Cresswell U.S. Patent No. 2,558,730, the gelled filamentary material is preferably washed with water to remove uncombined salt, e.g., thiocyanate. The water-washed material is then contacted, as by immersion, with an aqueous ammoniacal solution of the kind and for the purpose previously mentioned, after which the resulting product is again washed with water.

By practicing the method of the present invention, as described briefly above and more fully hereinafter, a simple and inexpensive means is provided for removing bound anions, such as thiocyanate, from the fiber and which, if not removed substantially completely, may tend to contribute color or adversely affect the dyeability of the finished fiber or the fabric made from such a fiber. The treatment also removes any other impurities that are soluble in an aqueous ammoniacal solution and which may affect, or tend to affect, the color, heat stability or dye receptivity of the finished fiber or filament. Furthermore, the wet fiber does not stain with iron in the form of, for example, ferric thiocyanate; and turbidity of the coagulating bath that may occur when it becomes too acidic is obviated or minimized since the ammoniacal washings can be concentrated along with the other wash liquors to the desired concentration, and then added as "make-up" to the coagulating bath.

The above and other advantageous results flowing from the invention are obtained without adversely affecting the other useful properties of the filamentary polyacrylonitrile (e.g., tenacity, elongation, water resistance, abrasion resistance, etc.), and in no way could have been predicted, especially in view of the well-known fact that polyacrylonitrile filaments, as normally produced, are attacked by certain other alkaline solutions upon prolonged immersion therein, e.g., for 1 day in a 10% aqueous sodium hydroxide solution at 50° C. Furthermore, it could not have been predicted that the degree of hydrophyllic character of the filamentary salt form of acrylonitrile-vinylpyridine copolymer could be reduced by removal of inorganic anions, which are held by a relatively strong tertiary amine (vinylpyridine) group, by contacting it with a relatively weak base such as an aqueous solution of ammonia.

The filament-forming inorganic acid salt of the acrylonitrile polymer that also contains a vinylpyridine combined in the polymer molecule is prepared by known methods, e.g., as described in Rothrock U.S. Patent No. 2,640,049, dated May 26, 1953, or by the method disclosed and claimed in the copending application of Walter M. Thomas and David C. Guth, Serial No. 525,189, filed July 29, 1955, assigned to a common assignee with that of the instant application, and now abandoned. Likewise, various known methods can be used to form the gelled filamentary material from the polymeric salt, e.g., as described in the aforementioned U.S. Patents 2,140,921—Rein; 2,558,730—Cresswell; and British Patents 714,530 and 732,135.

In practicing the present invention a preferred method of forming the gelled filaments involves dissolving an inorganic acid salt (e.g., a nitric, hydrochloric, sulphuric, phosphoric, etc., salt) of an acrylonitrile-vinylpyridine copolymer of the kind with which this invention is concerned in a concentrated aqueous solution of an alkali-metal thiocyanate (e.g., sodium thiocyanate, potassium thiocyanate, lithium thiocyanate, etc.) to form a spinning solution. The concentration of the alkali-metal thiocyanate, which preferably is sodium thiocyanate, in the water in all cases is sufficiently high so that the resulting solution will dissolve the acrylonitrile polymer. In most cases the concentration of thiocyanate is substantially above 40% (e.g., from 45–50% to 55–60%) of the total weight of the solution of thiocyanate dissolved in water, the upper limit being a saturated solution of the thiocyanate in water.

In forming the gelled, polyacrylonitrile filaments in accordance with the preferred method, an alkali-metal thiocyanate solution of an acrylonitrile polymer of the kind described above (and which contains bound anions) is deaerated, filtered and passed under pressure to an extrusion head and thence through the openings or orifices in a spinnerette into a liquid coagulating bath comprising an aqueous solution containing from about 3% (preferably at least about 5%) to about 20%, by weight, of an alkali-metal thiocyanate. From a practical standpoint and to simplify the recovery problem, it is desirable that the thiocyanate employed in producing the liquid coagulating bath be of the same kind as that used in forming the concentrated aqueous solution in which the acrylonitrile polymerization product is dissolved.

As the spinning solution is forced under pressure through the openings in the spinnerette it coagulates or precipitates in the form of gelled filaments upon entering the above coagulating bath. (In the preferred embodiment of the invention, the coagulating bath is maintained at a temperature not exceeding +10° C. by any suitable means, and in some cases advantageously is maintained at or below 0° C., e.g., at —9° C. to —5° C.) By using a liquid coagulating bath containing about 3–20%, by weight, of dissolved alkali-metal thiocyanate, coagulation takes place somewhat more gradually than when cold water alone is used as the liquid coagulant, other conditions being the same, thereby minimizing or obviating the formation of a dense skin on the surface of the individual filaments upon subsequent drying, with obvious disadvantages from the standpoint of ease of drying, greater amenability to dyeing, etc.

If desired, a water-miscible alcohol also may be incorporated into the coagulating bath along with the alkali-metal thiocyanate as is described more fully in, for instance, British Patent Nos. 732,135 and 738,759. Such alcohols include methyl, ethyl, propyl, isopropyl, n-butyl, sec.-butyl and tert.-butyl alcohols, which constitute a preferred class because of their relatively low boiling points; although one can also use the higher monohydric alcohols as well as the various polyhydric alcohols (e.g., dihydric, trihydric, etc.), these are less desirable from an economic and operating standpoint. The alcohol, if employed, generally constitutes at least 4%, e.g., from 5% to 15%, by weight of the bath.

Instead of, or in addition to, the modification which comprises incorporating an alcohol in the coagulating bath, one can also add an alcohol to the spinning solution as is described more fully in, for instance, British Patent No. 714,530.

When alcohol is a component of the spinning solution, or the coagulating bath, or both, the bath temperature may range, for instance, from −15° C. to +10° C., as in the aforementioned U.S. Patent No. 2,558,730, or at higher temperatures ranging, for example, up to 40° C. The gelled, polyacrylonitrile filamentary material obtained under these conditions is a hydrogel-alcogel product, that is, it contains both water and alcohol in the gel structure in addition to the alkali-metal thiocyanate and the polyacrylonitrile.

After emerging from the coagulating bath the extruded, gelled filamentary material may be given a cold solvent stretch, followed by treatment in accordance with the present invention, and then hot stretching. If the initial stretch is omitted, the gelled filaments are treated by the procedure of my invention immediately after leaving the coagulating bath. In the first stage most of the uncombined thiocyanate is removed, while in the second stage the bound thiocyanic acid is removed substantially completely and the gelled, filamentary acrylonitrile-vinylpyridine copolymer is largely or substantially completely (as desired or as may be required) converted to the freebase form.

The technique of washing to remove uncombined thiocyanate (or other solvent or salt or other soluble material that is present in free or uncombined state) may take various forms. Thus, washing with water may be done either in a series of troughs or while passing over a series of upper and lower serpentine rolls, the lower rolls of the series being immersed (or partly immersed) in a series of wash troughs. If serpentine washing technique be employed, the rolls over which the filaments pass during the washing step may all operate at the same peripheral speed or with each or some at a peripheral speed slightly lower than the one immediately preceding it in the series. Washing may be done with water at normal (e.g., 15°–30° C.) or at an elevated temperature (e.g., 35°–50° C.), or even at a reduced temperature (e.g., 1° C. up to 15° C.). If desired, a series of countercurrent wash troughs or vessels can be used, or any other suitable washing devices.

After removing most of the uncombined thiocyanate as above described, the water-washed gelled filamentary material is contacted with an aqueous ammoniacal solution having a pH ranging between about 8 and about 11 to render the aforesaid filamentary material substantially free of bound anions. The ammoniacal solution is preferably an aqueous solution of ammonia, but one also can use an aqueous solution of, for example, a mono-, di- or trimethyl, -ethyl or -propyl amine, or other volatile, relatively low-boiling amine, or other ammoniacal substance. The treatment with the aqueous ammoniacal substance can be effected as described above with reference to washing with water, e.g., by the use of serpentine rolls or by immersion in a trough or series of troughs. Ordinarily, the aqueous ammoniacal treatment is then followed by another washing with water.

The gelled, polyacrylonitrile, filamentary material resulting from the foregoing treatments is hot-stretched, e.g., between rolls (or series of rolls) the latter of which are operated at a higher peripheral speed than the former. This stretch is effected while the gelled material is in contact with moisture and at a temperature within the range of about 70° C. to about 110° C., preferably while it is in contact with water at a temperature of about 70° to about 100° C. When temperatures above 100° C. are to be employed, the medium may be steam or hot water under superatmospheric pressure. Good results are obtained when the aqueous fluid medium in which the gelled, filamentary material is stretched is water within the range of about 90° C. to about 100° C. The degree of stretch may be widely varied but generally is from three to fifteen times the length of the unstretched material. If the freshly extruded, gelled filaments have been given a cold, solvent stretch (e.g., as is more fully disclosed in the copending application of P. W. Cummings, Jr., Serial No. 554,155, filed December 20, 1955, and assigned to a common assignee with that of the instant application), then the washed, filamentary material (or filamentary material which has been otherwise treated for the removal of thiocyanate) is generally stretched to between one and one-half and ten times its once-stretched length, the second stretch being correlated with the first stretch so that the total stretch is to from to fifteen times the length of the said filamentary material immediately before the first stretch.

After being hot-stretched, the filamentary material may be rinsed if desired with, for example, water. Such a rinsing operation, however, is optional and may be omitted.

Following the rinsing step (if applied to the gelled material) the gelled filaments are dried or conditioned (e.g., as disclosed and claimed in the copending application of Robertson et al., Serial No. 601,061, filed July 30, 1956, and abandoned in favor of continuation-in-part application Serial No. 755,020, filed August 14, 1958, both of said applications being assigned to a common assignee with that of the instant application). In the case of the production of polyacrylonitrile tow the dried material may be crimped and further processed to yield a product which is sold as tow; or, after crimping, it may be cut to staple lengths and further processed to yield fibers which are baled and sold as such.

In order that those skilled in the art better may understand how the present invention can be carried into effect, the following examples are given by way of illustration and not by way of limitation. All parts and percentages are by weight.

EXAMPLE 1

A terpolymer is made from a monomeric mixture of 7.5% methyl acrylate, 7.5% 2-methyl-5-vinylpyridine and 85% acrylonitrile by polymerizing in an aqueous medium with an oxidation-reduction catalyst system comprised of chloric acid and sulfurous acid, and in the presence of a small amount of nitric acid. The resulting terpolymer contains, in combined state, about 85.0% acrylonitrile, about 5.4% 2-methyl-5-vinylpyridine, about 7.5% methyl acrylate, and about 2.1% of combined nitric acid which resists washing out with water. This polymer is dissolved in 50% aqueous sodium thiocyanate to make a solution containing 9.5% by weight of polymer. After deaeration and filtration the polymer solution is preheated and then extruded through a spinnerette having 45 holes of 75 microns diameter into 10% aqueous sodium thiocyanate at −2° C. The coagulated (gelled) filaments formed thereby are then washed with either water or water containing either 0.1%, 0.3% or 0.5% $NH_3$, the washing conditions in each case otherwise being identical. The pH of the aqueous ammonia solutions in all cases is within the range of 8 to 11.

Analysis of the washed threads before stretching shows the following:

| Wash: | Percent HSCN, calculated as NaSCN |
|---|---|
| Water | 1.85 |
| 0.1% $NH_3$ | 0.12 |
| 0.3% $NH_3$ | 0.06 |
| 0.5% $NH_3$ | 0.06 |

Subsequent to the above steps of extrusion and washing, each gelled multifilament thread is stretched to 9 times its extruded length in water maintained at about 98° C. Following stretching, the thread is continuously dried with application of an antistatic agent, and finally is shrunken 15% by passage through a zone maintained at 400° C.

All of the finished yarns are found to have essentially identical stress-strain characteristics.

Swatches of the washed, dried and shrunken threads (one water-washed and three ammonia-washed) are individually dyed with premetallized acid dyes. Those which had been ammonia-washed are "on-shade," that is, the color shade is that which is normally obtained with the individual dye; while the dyed swatch which had been washed with water alone is "off-shade."

EXAMPLE 2

A terpolymer is made from a monomeric mixture of 7.5% vinyl acetate, 7.5% 2-methyl-5-vinylpyridine and 85% acrylonitrile by polymerizing in an aqueous medium with an oxidation-reduction catalyst system comprised of chloric acid and sulfurous acid, and in the presence of a small amount of nitric acid. The resulting terpolymer contains, in combined state, about 86.0% acrylonitrile, about 6.3% 2-methyl-5-vinylpyridine, about 5.4% vinyl acetate, and about 2.3% of combined nitric acid which resists washing out with water. This polymer is dissolved in 48% aqueous sodium thiocyanate to make a solution containing 10.2% by weight of polymer. After deaeration and filtration the polymer solution is preheated and then extruded through a spinnerette having 3184 holes of 90 microns diameter into 10% aqueous sodium thiocyanate at −2° C.

The gelled tow is then washed countercurrently with either deionized water or water containing 0.14% by weight of NH$_3$. The pH of the ammoniacal wash water is about 10.9.

Analysis of the tows washed under otherwise identical conditions shows the following content of thiocyanic acid calculated as sodium thiocyanate:

|  | Washed with Water | Washed with 0.14% Aqueous NH$_3$ |
|---|---|---|
|  | Percent | Percent |
| Before stretching | 3.48 | 0.56 |
| After stretching | 2.60 | 0.35 |

Stretching (about 8 times the extruded length) is done while the gelled tows are being passed through water maintained at about 98° C. The stretched tows are then dried and, if desired, may be cut into staple lengths. Better dyeings with premetallized acid dyes, from the standpoint of closeness to the shade normally given by the individual dye, are obtained on samples of the stretched ammonia-washed tow than on samples of the tow which has been washed with water alone.

For purposes of comparison, a gelled tow similarly spun from a similarly prepared acrylonitrile copolymer containing no vinylpyridine combined in the polymer molecule (more particularly a copolymer of 5% methyl acrylate and 95% acrylonitrile), which tow has been washed with water under the identical conditions described above, shows 0.25% thiocyanic acid calculated as NaSCN before stretching and 0.01% after stretching. Similar results are obtained when the gelled tow is one that has been similarly made from a copolymer of 5% vinyl acetate and 95% acrylonitrile and which has been produced in essentially the same manner as the aforementioned acrylonitrile-methyl acrylate copolymer.

EXAMPLE 3

The same terpolymer prepared as in Example 2 is slurried with dilute ammonia such that after filtration and washing the combined nitric acid retained in the polymer is 0.5%, as is more fully described and claimed in the copending application of James C. French, William J. Boyne and Darwin F. DeLapp, Serial No. 605,269, filed concurrently herewith, and assigned to a common assignee with that of the instant application. The polymer is dissolved in 48% aqueous sodium thiocyanate to make a solution containing 10.2% by weight of polymer. This is extruded as described in Example 2, and the resulting gelled, filamentary tow is countercurrently washed either with water or with water containing 0.14% by weight of NH$_3$ under otherwise identical conditions.

Analysis of the tows for thiocyanic acid content, calculated as NaSCN, shows the following:

|  | Washed with Water | Washed with 0.14% Aqueous NH$_3$ |
|---|---|---|
|  | Percent | Percent |
| Before stretching | 1.12 | 0.76 |
| After stretching | 0.05 | 0.02 |

The stretched tow is dried as was done in Example 2. Upon dyeing samples of the stretched and dried tow with premetallized acid dyes, the shade of color of the dyed tow is that which is normally obtained with the individual dye; that is to say, it is "on-shade."

EXAMPLE 4

This example illustrates the results obtained upon dyeing, with a premetallized acid dye, dried filaments of an acrylonitrile polymer containing a vinylpyridine combined in the polymer molecule, and varying amounts of combined thiocyanic acid. The filamentary polyacrylonitrile (exclusive of the bound thiocyanic acid) shows, upon analysis, about 88% acrylonitrile, about 6.4% 2-methyl-5-vinylpyridine and about 5.6% vinyl acetate. The premetallized acid dye employed is Calcofast Wool Blue 2G (Color Index Prototype No. 144). The amount of combined thiocyanic acid in the respective samples is shown below:

Sample No.: Percent combined HSCN calculated as NaSCN
1 _____ 0.06
2 _____ 0.09
3 _____ 0.23
4 _____ About 1.0

The above samples are dyed by immersing dried swatches thereof in an aqueous dye bath containing, by weight of the said swatch, 2% of the aforementioned Calcofast Wool Blue 2G, 6% of 66° Bé. sulfuric acid and 5% of Glauber's salt. The ratio of the volume of the bath to that of the swatches is approximately 50 to 1. The swatches are dyed by boiling in the described dye bath for 1 hour, after which they are rinsed, dried and inspected.

There is a noticeable shade differential when the content of combined thiocyanic acid increases from slightly less than 0.1% (samples 1 and 2) to about 0.2% (sample 3), while dyed sample 4 is "off-shade." (The dye does not go "off-shade" in the presence of sodium thiocyanate, but only when the dye, the filaments of acrylonitrile-vinylpyridine copolymer and HSCN ions are present simultaneously.) The results of the foregoing tests indicate that, at least for the particular dye employed, the threshold value for a noticeable change in tone or shade is about 0.2%–0.25% of combined thiocyanic acid calculated as NaSCN.

EXAMPLE 5

The results of another series of tests, both with and without an aqueous ammonia wash, on a gelled, basic, polyacrylonitrile tow are given in the table which follows. The copolymer composition is approximately the same as that of the copolymer of Example 2, the amount of combined nitric acid therein having been reduced to about 0.5% by slurrying with aqueous ammonia as in Example 3. The washed copolymer is dissolved in a 48% aqueous solution of sodium thiocyanate to form a spinning solution or "dope" containing about 10% of copolymer. After deaeration and filtration the dope is preheated and then, in separate runs, is extruded through a spinnerette having 2330 holes of 90 microns diameter into a coagulating bath of 10% aqueous sodium thiocyanate solution maintained at about 0° C. The spinning speed is 80 meters per minute. The gelled tow is given a cold, solvent stretch of 300%, after which it is washed continuously on converging, vertical rolls with water flowing on the rolls and over the tow as it moves in a helical path. The conditions of water wash on the vertical rolls, the subsequent treatments and some of the properties of the products are given in the following table.

|  | Run No. 1 | Run No. 2 | Run No. 3 |
|---|---|---|---|
| Verticals rolls: |  |  |  |
| Reagent | Water | Water | Water. |
| Temperature | +8° C | +8° C | +8° C. |
| Flow rate | 2 l./min | 2 l./min | 2 l./min. |
| Treatment in troughs | None |  |  |
| Troughs |  | 1 to 5 | 1 to 5. |
| Reagent |  | Aqueous NH₃ | Aqueous NH₃. |
| pH |  | 11.0 | 10.0. |
| Temperature |  | 25° C | 25° C. |
| Flow rate |  | 2 l./min | 2 l./min. |
| Troughs |  | 6 to 10 | 6 to 10. |
| Reagent |  | Water | Water. |
| Temperature |  | 25° C | 25° C. |
| Flow rate |  | 2 l./min | 2 l./min. |
| Hot stretched, percent | 333 | 333 | 333. |
| Temp. of stretch bath | 100° C | 100° C | 100° C. |
| Properties of dry ¹ tow: |  |  |  |
| Combined HSCN calculated as NaSCN in percent (bone dry basis). | 0.33 | 0.0 | 0.18. |
| Denier | 3.0 | 2.8 | 2.9. |
| Elongation, percent | 31.0 | 28.5 | 27.5. |
| Tenacity, grams per denier | 4.1 | 4.0 | 4.2. |

¹ Drying conditions for Runs 1 and 2: Oven-dried at 170° F., 70% relative humidity, for 3 hours and then at 170° F. (dry heat) for 3 hours; for Run 2: oven-dried at 185° F., 42% relative humidity, for 2 hours.

When samples of the dried tows of runs 1, 2 and 3 are dyed under identical conditions with a premetallized acid dye, specifically Calcofast Wool Blue 2G, as described under Example 4, the dyed sample of run No. 2 (0% combined HSCN) is "on-shade"; that of run No. 3 (0.18% HSCN calculated as NaSCN) shows a noticeable shade differential over that of the dyed tow of run No. 2; while that of run No. 1 (0.33% HSCN calculated as NaSCN) shows a perceptible shade differential over that of the dyed tow of run No. 3, and a distinct shade differential over that of the dyed tow of run No. 2.

Similar results to those described under Examples 1 to 5, inclusive, are obtained when one of the following acrylonitrile copolymers is employed instead of the particular copolymer used in the individual example to make (or from which was made) the filamentary polyacrylonitrile:

*Copolymer composition*

95% acrylonitrile and 5% 2-vinylpyridine
92% acrylonitrile and 8% 2-methyl-5-vinylpyridine
95% acrylonitrile and 5% 2-vinyl-5-ethylpyridine
85% acrylonitrile, 7.5% methyl acrylate and 7.5% 2-vinylpyridine
84% acrylonitrile, 8% acrylamide and 8% 2-methyl-5-vinylpyridine
90% acrylonitrile, 5% hydroxyethyl methacrylate and 5% 2-methyl-5-vinylpyridine
86% acrylonitrile, 7% allyl alcohol and 7% 2-vinyl-5-ethylpyridine (or 7% 2-methyl-5-vinylpyridine)

The preferred filament-forming acrylonitrile copolymers (in the form of an inorganic acid salt thereof) that are used in making filaments therefrom in accordance with this invention are those containing, by weight, a major amount of acrylonitrile and a minor amount of a vinylpyridine combined in the polymer molecule, and especially those containing, by weight, at least 80% acrylonitrile and at least 2% of a vinylpyridine (preferably a methyl vinylpyridine including 2-methyl-5-vinylpyridine). A preferred sub-class within this broader class is that comprised of filament-forming copolymers (in the form of, for example, a thiocyanic salt thereof) of, by weight, from 80% to 96% acrylonitrile, from 2% to 10% of a vinylpyridine (and which preferably includes 2-methyl-5-vinylpyridine) and from 2% to 10% of a third different monoethylenically unsaturated material, e.g., vinyl esters including the formate, acetate, propionate; the various acrylic esters including the lower alkyl acrylates and methacrylates such as the methyl, ethyl and propyl acrylates and methacrylates; the various acrylamides including acrylamide itself and methacrylamide; the various acrylic acids including acrylic acid itself and methacrylic acid; methacrylonitrile and other copolymerizable substituted acrylonitriles; unsaturated alcohols including allyl alcohol; vinyl-substituted aromatic hydrocarbons, e.g., styrene, the various ring-substituted methylstyrenes; isopropenyl toluene; and others including those given by way of example in, for instance, Cresswell U.S. Patent No. 2,558,730, dated July 3, 1951 (column 3, lines 31–55), and Price U.S. Patent No. 2,736,722, dated February 28, 1956 (column 4, line 66 through line 27 in colum 5). The "third different monoethylenically unsaturated material" mentioned above includes within its meaning a plurality of such materials.

Vinlypyridines which can be employed in making copolymers with acrylonitrile, and used as herein described, are vinylpyridines represented by the formula (I) 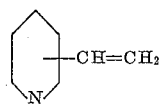

and which include 2-vinylpyridine, 3-vinylpyridine and 4-vinylpyridine; methyl vinylpyridines represented by the formula (II) 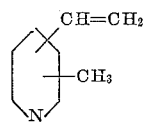

and which include 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine and 3-methyl-4-vinylpyridine. The vinylpyridines embraced by Formula II are a preferred sub-group within a broader class of vinylpyridines that are advantageously employed in making copolymers for use in practicing the present invention and which may be represented by the formula (III) 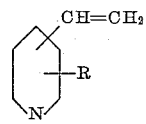

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula (IV) 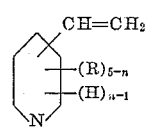

wherein R represents a lower alkyl radical, examples of which have been given hereinbefore, and $n$ represents an integer from 1 to 5, inclusive.

One can substitute in the copolymers mentioned in the specific examples an equivalent amount of any of the vinylpyridines, of which numerous examples have just been given, for the specific vinylpyridine named in the individual example, and then make spinning solutions from which filamentary polyacrylonitrile is produced in accordance with the present invention.

Ordinarily, the molecular weight (average molecular weight) of the acrylonitrile-vinylpyridine copolymer is within the range of from about 30,000 to about 200,000, more particularly from about 40,000 to about 100,000, and still more particularly from about 60,000 to about 80,000, as calculated from a viscosity measurement of the said copolymer in dimethyl formamide using the Staudinger equation (reference: Houtz U.S. Patent No. 2,404,713, dated July 23, 1946). Acrylonitrile-vinylpyridine copolymers which yield a solution having a specific viscosity at 40° C. within the range of 2 to 10 when 1 gram of the copolymer is dissolved in 100 ml. of 60% aqueous sodium thiocyanate have an average molecular weight which enables the copolymer to be used as a filament-forming material and such copolymers (in the form of their inorganic acid salts) can, therefore, be used in forming the spinning solutions from which are made the gelled filaments that are treated in accordance with the present invention.

The spinning solutions employed are preferably those produced by dissolving the copolymer in a solvent comprising a concentrated aqueous solution of a water-soluble salt which yields highly hydrated ions in an aqueous solution. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. As indicated hereinbefore, the preferred salt is an alkali-metal thiocyanate, specifically sodium thiocyanate. Other examples of suitable solvents are concentrated aqueous solutions of guanidine thiocyanate, the mono-(lower alkyl)-substituted guanidine thiocyanates, and the symmetrical and unsymmetrical di-(lower alkyl)- substituted guanidine thiocyanates.

Filaments spun from organic-solvent solutions of an acrylonitrile-vinylpyridine copolymer containing bound anions and which are wet-spun into a coagulating bath comprising water to form the gelled filamentary material are amenable to treatment in accordance with the present invention, the treatment being particularly advantageous in those cases wherein the aqueous coagulating bath contains a water-soluble thiocyanate. In making such spinning solutions the organic solvent can be dimethyl formamide or any of the other organic solvents described in the U.S. patents mentioned in the last sentence of the second paragraph of this specification, and especially those which are soluble in or miscible with water.

The concentration of the acrylonitrile-vinylpyridine copolymer in the chosen solvent should be such that a composition having a workable viscosity is obtained. This concentration will depend, for example, upon the particular solvent and extrusion apparatus employed, the diameter of the filament or other shaped article to be extruded and the average molecular weight of the copolymer. The concentration may range, for example from 7% to 8% up to 16% or 18% or more by weight of the solution. The viscosity of the solution, as determined by measuring the time in seconds for a Monel metal ball ⅛ inch in diameter to fall through 20 cm. of the solution at 61° C., may be, for instance, from 20 to 200 seconds. Usually the best spinning solutions from the standpoint of coagulation and optimum properties of the precipitated gel are those which contain the highest concentration of the acrylonitrile-vinylpyridine copolymer that is consistent with solubility and viscosity characteristics. The chosen concentration may, however, require that consideration be given to other influencing factors, e.g., the optimum spinning speed for the particular production unit.

It will be understood, of course, by those skilled in the art that my invention is not limited to the particular conditions described broadly above and more specifically in the illustrative examples. Thus, instead of washing with water at the particular temperatures mentioned in, for instance, the table forming a part of Example 5, the temperatures of the wash water may range from, for example, 1° C. to 50° C. as was described more fully in a portion of this specification prior to the examples. Higher temperatures are not precluded, especially during the later stages, and can be up to 100° C., or even higher; but no particular advantages generally accrue from the use of such temperatures prior to or after contacting the gelled filamentary material with an aqueous ammoniacal solution having a pH ranging between about 8 and about 11.

The temperature of the aqueous ammoniacal solution, as applied to the gelled filamentary polyacrylonitrile, likewise may be considerably varied, e.g., from 2° or 3° C. to room temperature (20°–30° C.). Temperatures above room temperature are not precluded, but have the disadvantage that special equipment may be required in order to minimize or obviate the health hazard to workmen that is involved in using an aqueous solution of a volatile ammoniacal compound, e.g., ammonia, mono-, di- or tri-methyl, -ethyl, or -propyl amine, or other normally liquid, relatively low-boiling amine, or other ammoniacal substance.

Other variations within the spirit and scope of the present invention will be apparent to those skilled in the art from the foregoing description and the accompanying drawing, which schematically illustrates the invention, and wherein 1 represents a tow of gelled filaments of an inorganic acid salt of an acrylonitrile-vinylpyridine polymer that is formed upon extrusion of the spinning solution containing the said polymer into the aqueous coagulating bath 2, thence, if desired, into the water bath 3, next into a bath 4 of an aqueous ammoniacal solution having a pH between about 8 and about 11, and then, if desired, into the water bath 5.

I claim:

1. In the production of filaments from a filament-forming inorganic acid salt of an acrylonitrile polymer that contains, by weight, a major amount of acrylonitrile and a minor amount of a vinylpyridine combined in the polymer molecule, said inorganic acid salt being selected from the class consisting of (a) thiocyanic acid salt of the said polymer and (b) inorganic acid salts of the said polymer that are convertible into thiocyanic acid salt of the said polymer when the former is brought into contact with an aqueous composition containing a water-soluble thiocyanate, the improvement which comprises wet-spinning, into an aqueous coagulating bath, a solution of the said salt of the said polymer to form a gelled filamentary material, at least one of the compositions constituting the said aqueous coagulating bath and the said solution containing a water-soluble thiocyanate; and contacting the said gelled filamentary material with an aqueous ammoniacal solution having a pH ranging between about 8 and about 11 to render the said filamentary material substantially free of bound anions.

2. In the production of filaments from a filament-forming thiocyanic acid salt of an acrylonitrile polymer that contains, by weight, a major amount of acrylonitrile and a minor amount of a methyl vinylpyridine combined in the polymer molecule, the improvement which comprises wet-spinning, into an aqueous coagulating bath, a solution of the said polymeric salt dissolved in a concentrated aqueous solution of a water-soluble thiocyanate thereby to form a gelled filamentary material; and contacting the said gelled filamentary material with an aqueous solution of ammonia to render the said filamentary material substantially free of bound anions, the pH of the said solution being between about 8 and about 11.

3. In the production of filaments from a thiocyanic acid salt of a filament-forming copolymer of, by weight, at least 80% acrylonitrile and at least 2% of a methyl vinylpyridine including 2-methyl-5-vinylpyridine, the improvement which comprises extruding a solution of the said polymeric salt dissolved in a concentrated aqueous solution of sodium thiocyanate through the openings in a spinnerette into a coagulating bath comprising water thereby to form a gelled filamentary material; washing the said gelled material with water to remove uncombined thiocyanate; contacting the water-washed material with an aqueous solution of ammonia to render the said material substantially free of bound thiocyanic acid, the pH of the said solution being between about 8 and about 11; and water-washing the resulting product.

4. The improvement as in claim 3 wherein the pH of the aqueous solution of ammonia is about 10.

5. In the production of filaments from a thiocyanic acid salt of a filament-forming copolymer of, by weight, from 80% to 96% acrylonitrile, from 2% to 10% of a vinylpyridine including 2-methyl-5-vinylpyridine and from 2% to 10% of a third different monoethylenically unsaturated material, the improvement which comprises extruding a solution of the said polymeric salt dissolved in a concentrated aqueous solution of sodium thiocyanate through the openings in a spinnerette into a coagulating bath comprising water having dissolved therein from about 5% to about 20% by weight thereof of sodium thiocyanate thereby to form a gelled filamentary material; washing the said gelled material with water to remove uncombined thiocyanate; contacting the water-washed material with an aqueous solution of ammonia to render the said material substantially free of bound thiocyanic acid, the pH of the said solution being between about 8 and about 11; and water-washing the resulting product.

6. The improvement as in claim 5 wherein the polymeric salt is a thiocyanic acid salt of a filament-forming copolymer of, by weight, from 80% to 96% acrylonitrile, from 2% to 10% of 2-methyl-5-vinylpyridine and from 2% to 10% of vinyl acetate, and the coagulating bath is at a temperature not exceeding +10° C.

References Cited in the file of this patent

UNITED STATES PATENTS

| | | |
|---|---|---|
| 2,639,969 | Ham | May 26, 1953 |
| 2,648,592 | Stanton et al. | Aug. 11, 1953 |
| 2,648,593 | Stanton et al. | Aug. 11, 1953 |
| 2,716,093 | McClellan | Aug. 23, 1955 |
| 2,777,751 | Cresswell et al. | Jan. 15, 1957 |

UNITED STATES PATENT OFFICE

CERTIFICATE OF CORRECTION

Patent No. 2,916,348                                              December 8, 1959

Arthur Cresswell

It is hereby certified that error appears in the printed specification of the above numbered patent requiring correction and that the said Letters Patent should read as corrected below.

Column 1, line 40, for the patent number "2,404,176" read -- 2,404,716 --; column 4, line 53, for "-5° C." read -- -0.5° C. --; column 6, line 13, after "from" insert -- three --; column 10, line 25, for "Vinlypyridines" read -- Vinylpyridines --.

Signed and sealed this 21st day of June 1960.

(SEAL)
Attest:

KARL H. AXLINE                                                    ROBERT C. WATSON
Attesting Officer                                             Commissioner of Patents